(12) United States Patent
Chang

(10) Patent No.: US 11,891,244 B2
(45) Date of Patent: Feb. 6, 2024

(54) GARBAGE CAN PROVIDED WITH AIRTIGHT MEANS FOR PREVENTING ODOR LEAKAGE

(71) Applicants: JANIBELL, INC., Rancho Cucamonga, CA (US); Kwang Ok Chang, Seoul (KR)

(72) Inventor: Kwang Ok Chang, Seoul (KR)

(73) Assignees: JANIBELL, INC., Rancho Cucamonga, CA (US); Kwang Ok Chang, Seoul (KR)

( * ) Notice: Subject to any disclaimer, the term of this patent is extended or adjusted under 35 U.S.C. 154(b) by 319 days.

(21) Appl. No.: 17/291,178

(22) PCT Filed: Nov. 7, 2019

(86) PCT No.: PCT/KR2019/015074
§ 371 (c)(1),
(2) Date: May 4, 2021

(87) PCT Pub. No.: WO2020/096377
PCT Pub. Date: May 14, 2020

(65) Prior Publication Data
US 2022/0127075 A1    Apr. 28, 2022

(30) Foreign Application Priority Data
Nov. 8, 2018   (KR) .................... 10-2018-0136550

(51) Int. Cl.
*B65F 1/14*     (2006.01)
*B65F 1/16*     (2006.01)
*B65F 1/06*     (2006.01)

(52) U.S. Cl.
CPC .............. *B65F 1/1607* (2013.01); *B65F 1/06* (2013.01); *B65F 1/163* (2013.01); *B65F 1/1646* (2013.01);
(Continued)

(58) Field of Classification Search
CPC .......... B65F 1/0607; B65F 1/06; B65F 1/163; B65F 1/1646; B65F 2001/1676; B65F 2210/167
(Continued)

(56) References Cited

U.S. PATENT DOCUMENTS

2018/0265287 A1    9/2018 Ng

FOREIGN PATENT DOCUMENTS

JP    S56145576    11/1981
JP    63017101    2/1988
(Continued)

OTHER PUBLICATIONS

International Search Report—PCT/KR2019/015074 dated Feb. 19, 2020.

*Primary Examiner* — John K Fristoe, Jr.
*Assistant Examiner* — Elizabeth J Volz
(74) *Attorney, Agent, or Firm* — CANTOR COLBURN LLP

(57) ABSTRACT

A garbage can provided with an airtight means for preventing odor leakage is provided. In the garbage can, garbage odors may be prevented from leaking into a gap between a cover for opening and closing an inlet for garbage of the garbage can in a casement method and an upper cap provided with the inlet for garbage formed thereon, and also the cover is automatically sealed and opened by the airtight means only by using a pressurizing panel used to open and close the cover without any additional operation, thereby providing convenience of use.

4 Claims, 7 Drawing Sheets

(52) U.S. Cl.
CPC . *B65F 2001/1676* (2013.01); *B65F 2210/167* (2013.01)

(58) Field of Classification Search
USPC ............ 220/263, 908, 908.1, 495.01, 495.06
See application file for complete search history.

(56) References Cited

FOREIGN PATENT DOCUMENTS

| | | | | |
|---|---|---|---|---|
| JP | H02054496 | | 4/1990 | |
| JP | H09030555 | | 2/1997 | |
| KR | 2019920007982 | | 5/1992 | |
| KR | 200339808 | | 1/2004 | |
| KR | 2003398080000 | * | 1/2004 | ................ B65F 1/14 |
| KR | 2020090005008 | | 5/2009 | |
| KR | 20150072507 | | 6/2015 | |
| KR | 2020150003363 | | 9/2015 | |
| KR | 20200150003363 | * | 9/2015 | ................ B65F 1/14 |
| KR | 101772615 | | 8/2017 | |
| KR | 2020180000098 | | 1/2018 | |

\* cited by examiner

GARBAGE CAN PROVIDED WITH AIRTIGHT MEANS FOR PREVENTING ODOR LEAKAGE

TECHNICAL FIELD

The present invention relates to a garbage can provided with an airtight means for preventing odor leakage, wherein garbage odors may be prevented from leaking into a gap between a cover for opening and closing an inlet for garbage of the garbage can in a casement method and an upper cap provided with the inlet for garbage formed thereon, and also the cover is automatically sealed and opened by the airtight means only by using a pressurizing panel used to open and close the cover without any additional operation, thereby providing convenience of use.

BACKGROUND ART

Korean Patent No. 10-1772615 relates to a garbage can having a structure in which odors are prevented by means of ultraviolet sterilization and automatic opening and closing of a cover of the garbage can, so as to promote a hygienic environment and convenience of use.

The garbage can of the above registered Korean Patent is configured to include: an outer case having an open upper side thereof; a cover coupled to an upper part of the outer case so as to be opened and closed and be made airtight with the upper part of the case; a sterilization means installed on the cover for sterilization and deodorization by generating ultraviolet rays and ozone toward an inner space of the case; an opening and closing means for automatically opening and closing the cover by detecting a user's approach; a power supply means; and a microcontroller for operating the sterilization means at a predetermined period while the cover is closed and controlling the opening and closing of the opening and closing means.

In this way, the above registered Korean Patent provides an effect in that the inside of the garbage can is sterilized and deodorized to be able to prevent the occurrence of odors, and the cover of the garbage can is automatically opened according to the user's approach and automatically closed after a certain period of time, thereby making it convenient for a user to throw garbage into the garbage can.

However, in the above registered Korean Patent, even though the garbage can prevents the occurrence of odors by repeated operation of the sterilization means, when food waste and the like are disposed, complete internal sterilization and deodorization are difficult, and in particular, when a large amount of garbage is loaded, the garbage can is unable to completely prevent the decay of garbage through the sterilization means, so the effect of preventing the occurrence of odors is insufficient.

Accordingly, when considering that the occurrence of odors cannot be completely prevented, another alternative has been to prevent odors inside the garbage can from leaking to the outside.

Meanwhile, in a configuration of the above registered Korean Patent, since the odors generated inside the garbage can leak into a gap between the garbage can and a cover covering an inlet for garbage, it is insufficient for the configuration to be able to prevent the leakage of such odors, and thus, there is a problem with a limitation in preventing odor leakage by using only general packing.

DISCLOSURE

Technical Problem

Accordingly, the present invention is devised to solve the above problems.

An objective of the present invention is to provide a garbage can provided with an airtight means for preventing odor leakage, wherein the cover is allowed to be in close contact with a rim of an inlet for garbage through magnetic attachment, so as to block odors being generated due to garbage decay in a garbage bag and leaking to the outside through a gap between the inlet for garbage and a cover, and relieve discomfort or inconvenience caused by the odors during use, and without the need for a user to perform additional operations, the cover attached with magnetic force is easily opened only by the operation of a pressurizing panel for opening the cover and automatically attached with magnetic force when the pressurizing panel is deactivated, thereby providing easier and more convenient use.

Technical Solution

In order to achieve the above-described objective, a garbage can according to the present invention includes:
  a main body provided with a pressurizing panel, an upper cap having an inlet for garbage, and a cover for opening and closing the inlet for garbage in a casement method;
  an airtight means for preventing odor leakage, the airtight means being provided at each position where the upper cap and the cover corresponds to each other and composed of a first attachment part and a second attachment part, which are magnetically attachable to each other; and
  an opening member connected to pass through the first attachment part of the upper cap, moving up and down in connection with pressurizing and returning operation of the pressurizing panel, and pushing the second attachment part of the cover to be separated from the first attachment part when raised.

In addition, in the garbage can according to the present invention,
  the opening member may include: an operation bar having a middle part hingedly coupled to a lower side of the main body and having opposite ends thereof operated in seesaw movement by the pressurizing panel; a raising and lowering bar connected to an upper side at an outer end of the operation bar; and a push bar comprising a push protrusion that has one end thereof hingedly coupled to a lower side of the upper cap to be rotated up and down by the raising and lowering bar, is fitted into the first attachment part of the upper cap, and pushes the second attachment part of the cover when rotating upward.

In addition, in the garbage can according to the present invention,
  the operation bar may include: a pressed part and a raised part respectively having downwardly inclined opposite ends connected to each other on the basis of a shaft part positioned at a center therebetween; a pressed protrusion protruding from an inner end of the pressed part to a lower part of the pressurizing panel so as to be connected; and a pressurizing protrusion bent upward at an outer end of the raised part and connected to the raising and lowering bar.

Furthermore, in the garbage can according to the present invention, the raising and lowering bar may be provided with a support part having a lower end thereof bent inward to be connected, and the pressurizing protrusion and the support part may be in contact with each other in a separated form and connected to each other so that the operation bar and the raising and lowering bar are interlocked with each other.

Advantageous Effects

A garbage can provided with an airtight means for preventing odor leakage according to the present invention has the following effects.

In spite of operation of a sterilization means, when odors are generated from garbage inside a garbage can, the odors are prevented from leaking to the outside of the garbage can through a gap between an inlet for garbage and a cover, thereby relieving discomfort or inconvenience caused by the odors during use.

In particular, through magnetic attachment, the cover is tightly attached and seated around the inlet for garbage, and at the same time, without the need for a user to perform an additional operation, the cover attached with magnetic force is easily opened only by the operation of a pressurizing panel for opening the cover and is automatically attached with magnetic force when the pressurizing panel is deactivated, thereby providing easier and more convenient use.

An opening member for opening the cover is individually manufactured for each part and is connected in a simplified structure, thereby not only securing convenience of production and reducing a manufacturing unit cost, but also reducing the risk of failure during the opening and closing operation of the cover in connection with the automatic opening of the cover.

DESCRIPTION OF THE MAIN NUMERALS IN THE DRAWINGS

Figure 1:
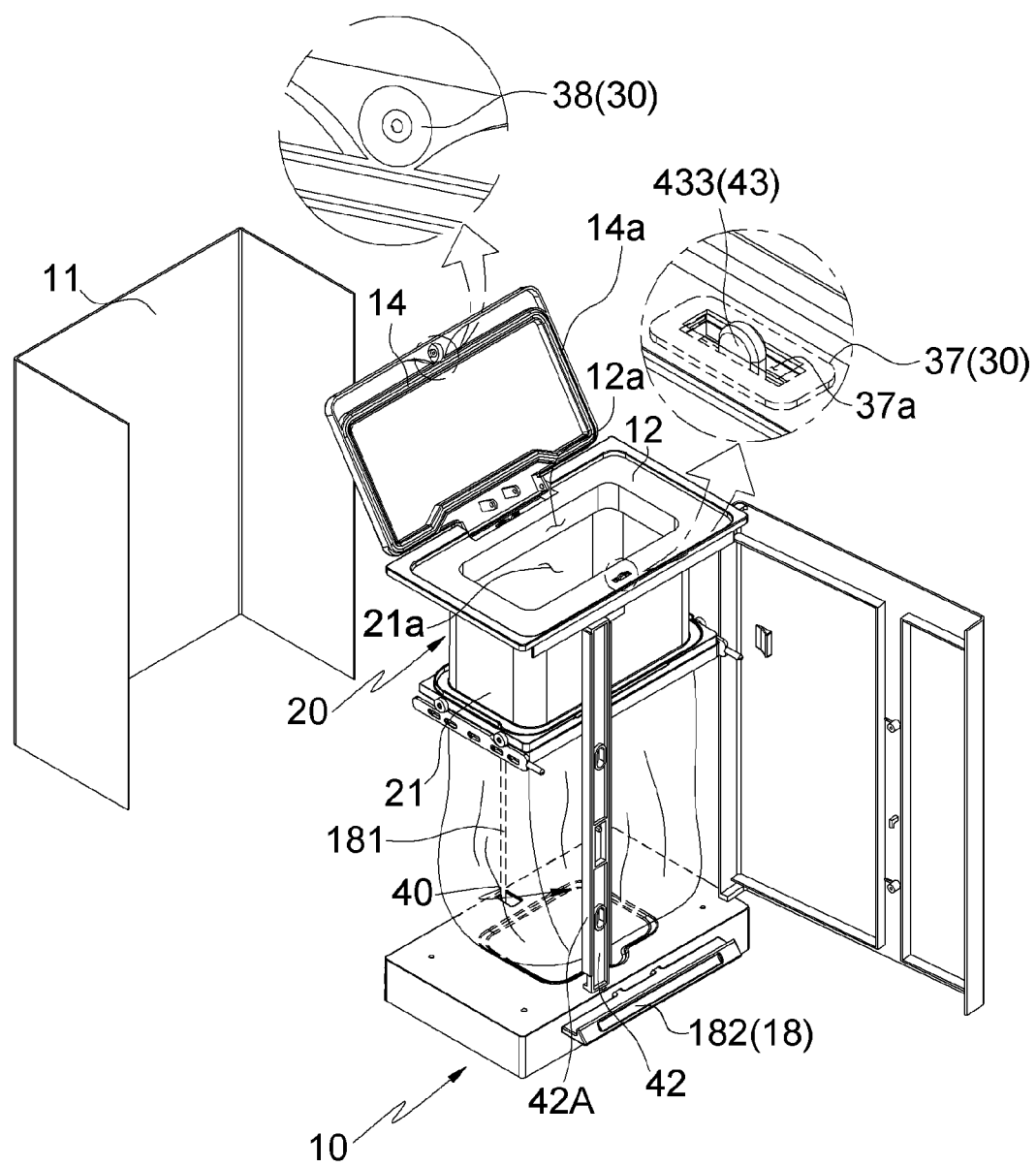
FIG. 1 is a perspective view showing a garbage can according to the present invention
Figure 2:
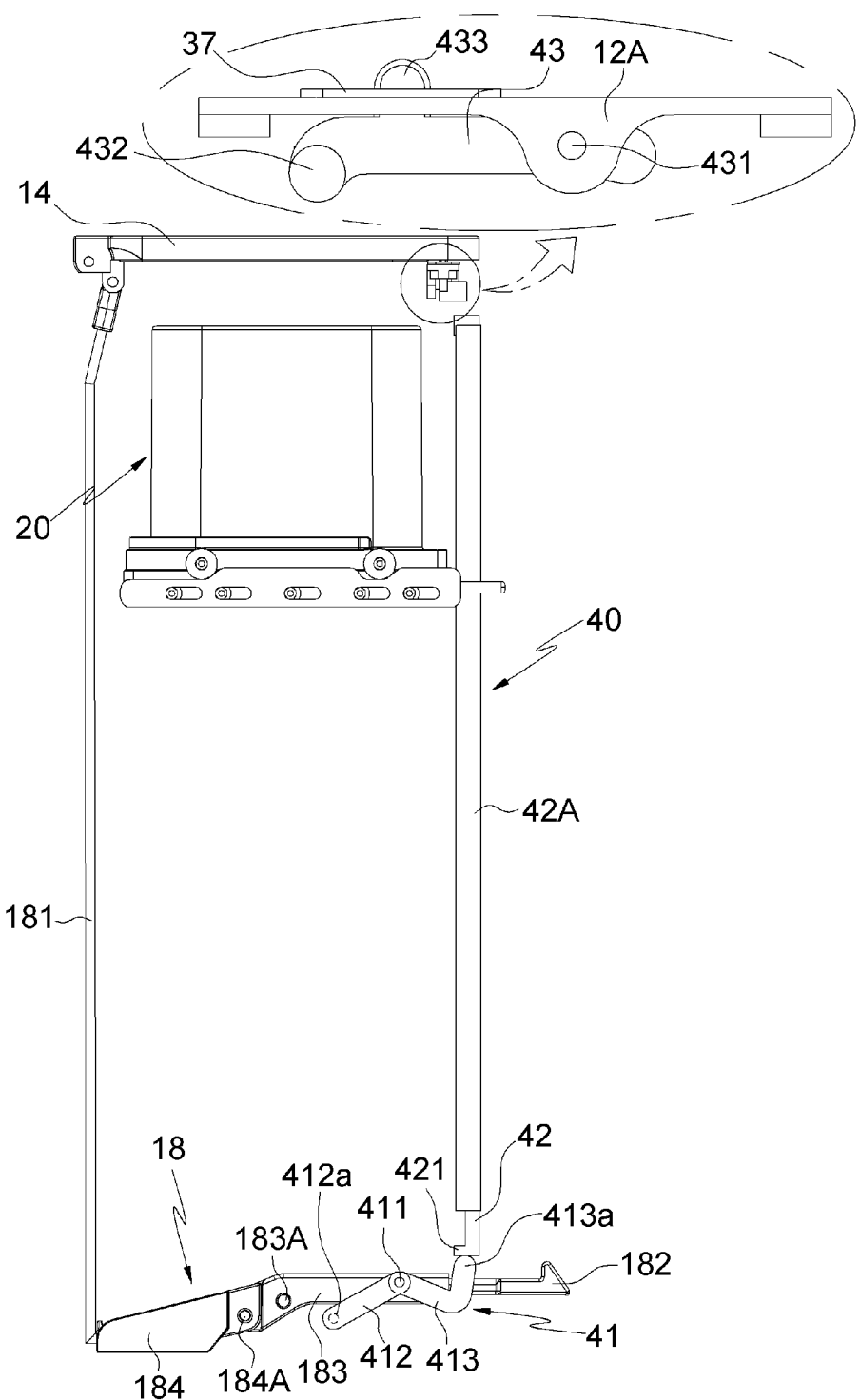
FIG. 2 is a perspective view of a main part showing an opening member according to the present invention.
Figure 3:
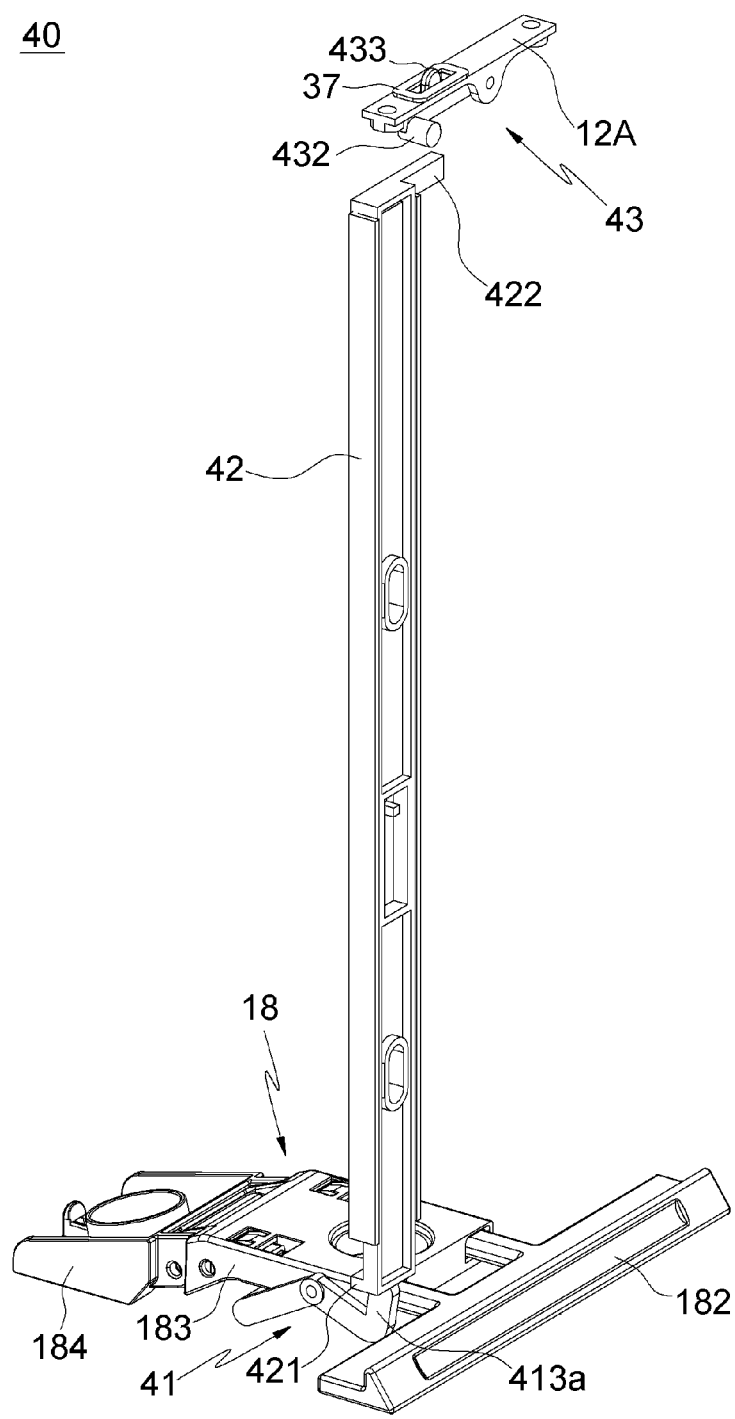
FIG. 3 is a side view of the main part showing an airtight means and the opening member according to the present invention.
Figure 4A:
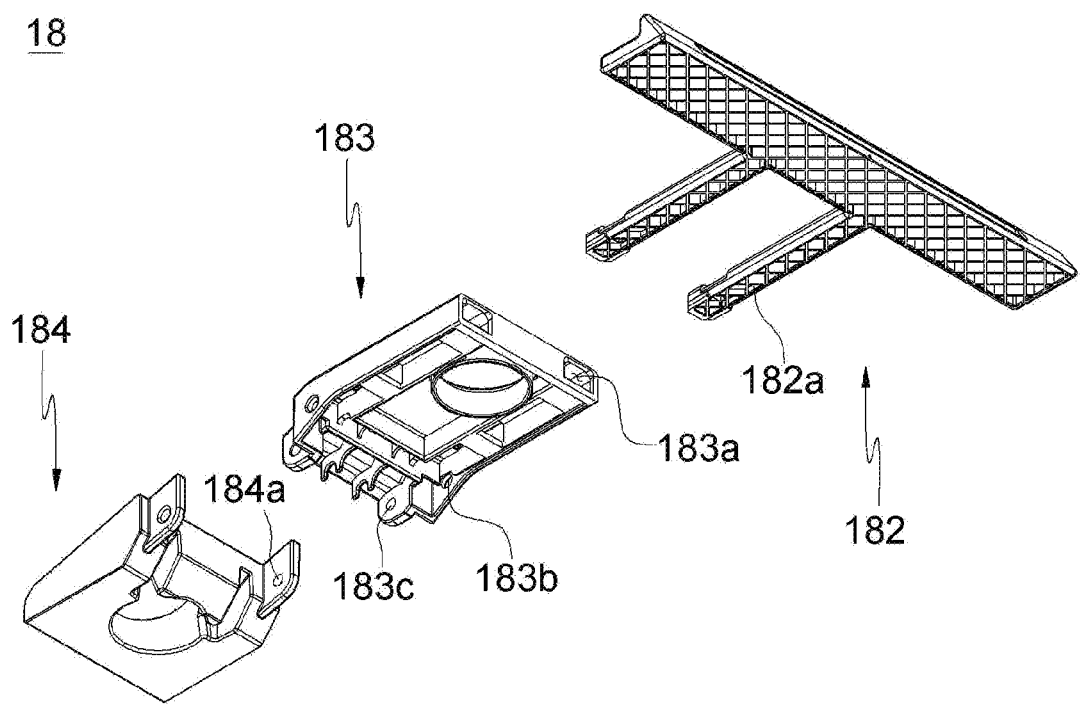
FIGS. 4A and 4B are an exploded perspective view showing a pressurizing panel according to the present invention.
Figure 4B:
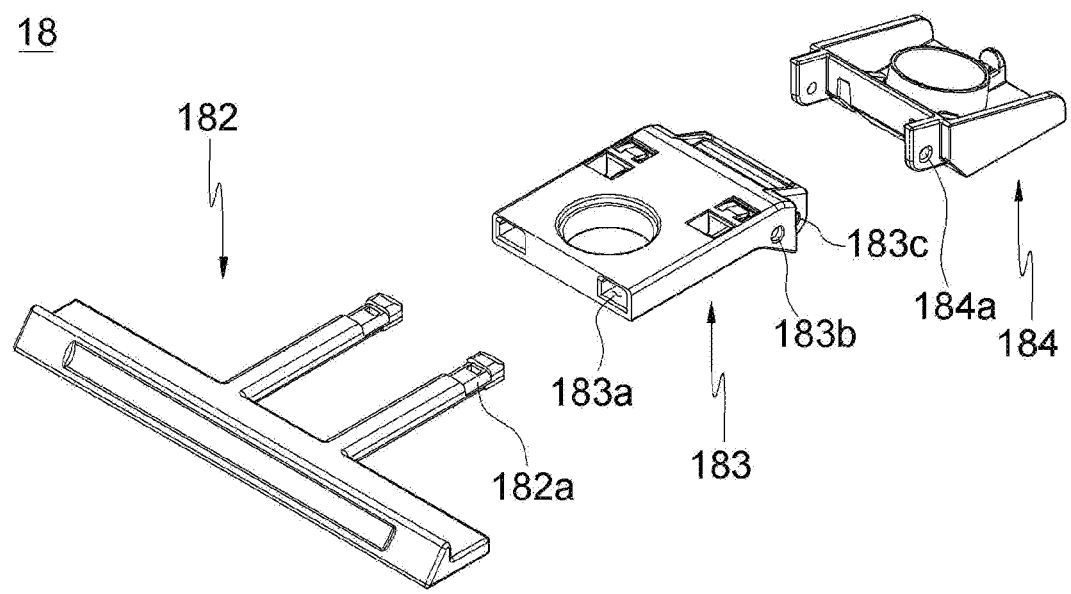
Figure 5:
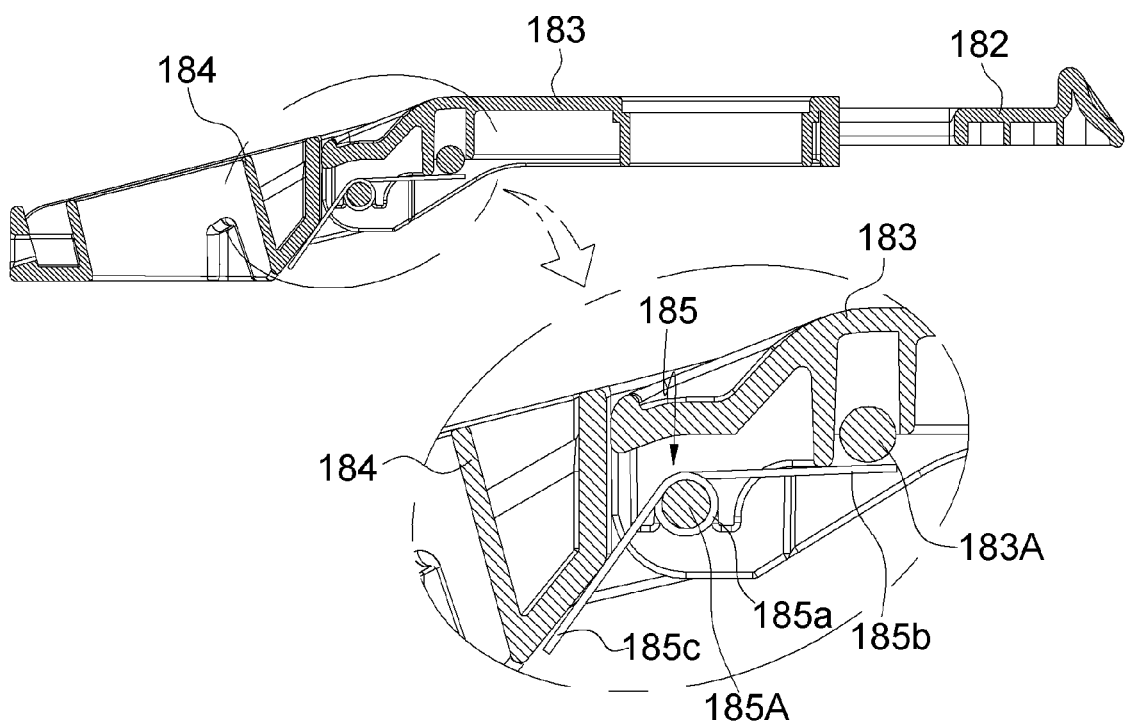
FIG. 5 is a cross-sectional view showing the pressurizing panel according to the present invention.
Figure 6:
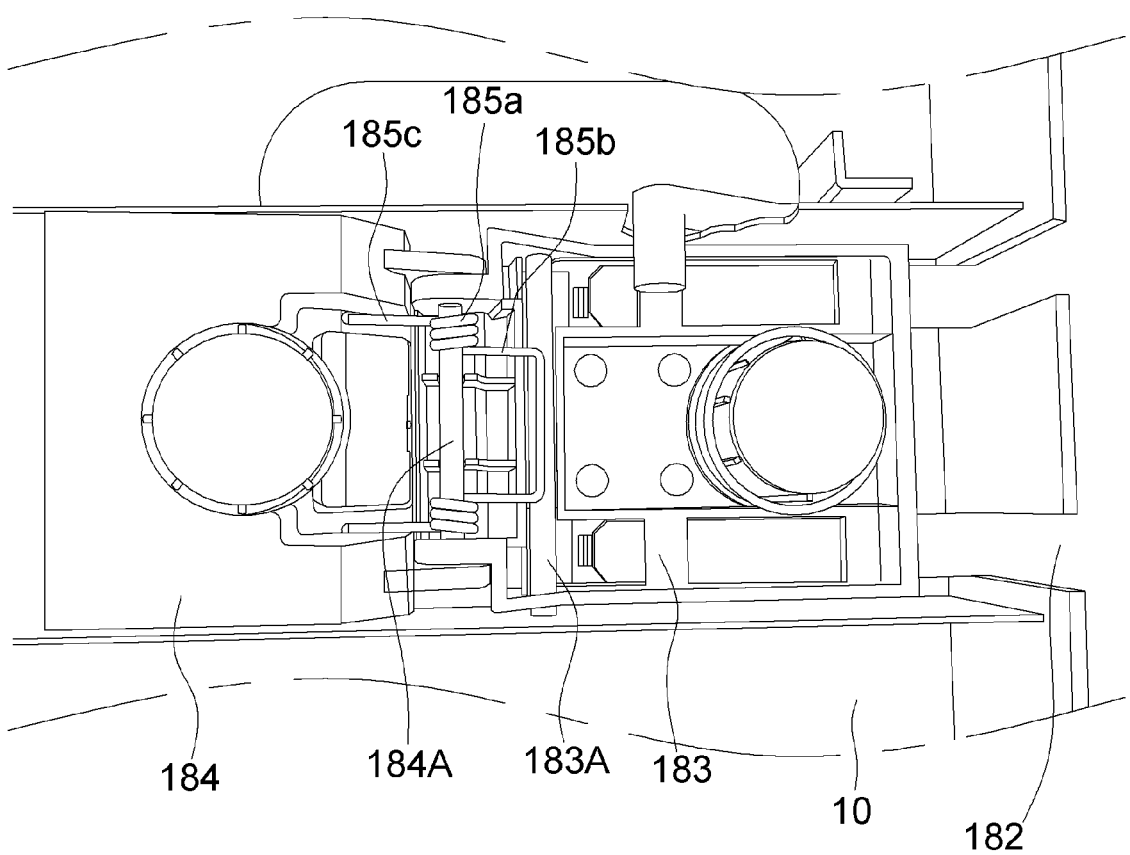
FIG. 6 is a perspective view showing a lower side of a main body according to the present invention.

10: man body 11: outer case
12: upper cap 12A: bracket
12a: inlet 14: cover
18: pressurizing panel 20: basket
21: side wall part 21a: opening
30: airtight means 37: first attachment part
37a: withdrawal hole 38: second attachment part
40: opening member 41: operation bar
42: raising and lowering bar 43: push bar
181: opening and closing bar 182: pedal part
182a: connection bar 183: first rotating body
183a: coupling hole 183b: first axial installation part
183c: second axial installation part 183A: first rotary shaft
184: second rotating body 184a: third axial installation part
184A: second rotary shaft 185: elastic body
185a: coil part 185b, 185c: elastic branch piece
411: first shaft part 412: pressed part
412a: pressed protrusion 413: raised part
413a: pressurizing protrusion 421: support part
422: pressurizing piece 431: second shaft part
432: pushed protrusion 433: push protrusion

BEST MODE

The present invention may, however, be embodied in many different forms and have various forms, and implementation examples (i.e., aspects or exemplary embodiments) will be described in detail in the specification. However, this is not intended to limit the present invention to a particular disclosed form. On the contrary, the present invention is to be understood to include all various alternatives, equivalents, and substitutes that may be included within the spirit and technical scope of the present invention.

In describing a garbage can provided with an airtight means for preventing odor leakage according to the present invention, for convenience, when specifying an approximate rough direction standard with reference to FIG. 1, a direction in which gravity acts is set as a lower side, and a visible direction, as it is, is set as each of the up, down, left, and right directions. In addition, in the detailed description and claims related to the other drawings as well, unless otherwise specified, directions are specified and described in accordance with this standard.

Hereinafter, a garbage can provided with an airtight means for preventing odor leakage according to the present invention will be described with reference to the accompanying drawings.

As shown in FIGS. 1 to 6, the garbage can according to the present invention includes: a main body 10 forming an outer case 11; an airtight means 30 for preventing odor leakage by closely contacting a cover 14 with an upper side of a rim of an inlet for garbage 12a to prevent leakage of odors; and an opening member 40 for facilitating opening of the cover 14 attached with magnetic force.

The main body 10 is provided with a garbage storage part therein, and the main body 10 where an inner basket 20 is provided on an inner upper end of the outer case 11 to place a garbage bag is representatively illustrated in the drawings of the present specification.

Describing schematically a configuration of such a main body 10, the inner basket 20 is provided with a sidewall part 21 forming upper and lower openings 21a and is coupled to an inner upper end of the main body 10, a garbage pouch that is usable as a garbage bag is fitted on an outer surface of the side wall part 21 of the inner basket 20, the garbage pouch is covered inward the basket 20 to be loosened therein, a lower end of the garbage pouch is tied to be used, and then the garbage pouch is cut and discharged when filled with garbage.

When the main body 10 having the above configuration is used, there is no need to place a new garbage bag for replacement each time inside the main body 10, and the garbage pouch may be cut and discharged depending on the amount of garbage, thereby providing great convenience.

However, the main objective of the present invention is to prevent leakage of odors by increasing the adhesion strength between the inlet for garbage 12a and the cover 14 and to make it easier to open the cover 14 that is in close adhesion, so the detailed configuration of the main body 10 may be changed such that a new garbage bag, like a recycling garbage bag, may be used by placing the garbage bag on the inner basket 20 and the like.

Specifically, the main body 10 is provided with a pressurizing panel 18, an upper cap 12 having an inlet for garbage 12a, and a cover 14 for opening and closing the inlet for garbage 12a in a casement method.

The pressurizing panel 18 includes a pedal part 182 hingedly coupled to a lower side of the main body 10 and rotating upward and downward, wherein opposite side ends of the opening and closing bar 181 vertically standing on the rear end of the main body 10 are connected to an inner end of the pressurizing panel 18 and an inner side of the cover 14 in a hinged coupling structure, so that during seesaw movement of the pressurizing panel 18, the cover 14 is automatically opened and closed.

In particular, the pressurizing panel 18 of the present invention has characteristics in that the cover 14 is automatically opened and closed in connection with the pressing and returning operation and the cover 14 is simultaneously attached and detached with magnetic force through the raising and lowering of the opening member 40. In this way, without the need for a user to perform an additional operation, the cover 14 attached with magnetic force may be easily opened only by the operation of the pressurizing panel 18 for opening the cover 14, in particular, only by stepping on the pressurizing panel 18 with the user's feet, and the cover 14 is automatically attached with magnetic force only by taking the user's foot off the pressurizing panel 18, thereby providing easier and more convenient use. A specific description associated with the above characteristics will be described later.

The upper cap 12 may further include an inner cover (not shown) that is opened and closed to double seal the inlet 12a of garbage from the inside, in addition to an outer cover 14 that covers the upper side of the outer case 11 to open and close the inlet for garbage 12a.

The cover 14 is rotated in a casement method by the pressurizing panel 18 to open and close the inlet for garbage 12a, and while having an area corresponding to the upper cap 12, the cover 14 is provided with a packing 14a on an inner side of the rim thereof, the packing 14a being in close contact with the upper side of the upper cap 12.

Each airtight means 30 for preventing odor leakage is provided at each position where the upper cap 12 and the cover 14 corresponds with each other, and is composed of a first attachment part 37 and a second attachment part 38, which are able to be attached by magnetic force to each other.

Here, the fact that the first and second attachment parts 37 and 38 are magnetically attached to each other means that any one of the attachment parts 37 and 38 is composed of a magnet, and correspondingly, the other attachment may be composed of metal materials such as iron to enable the magnetic attachment, as an example.

Alternately, as another example, each of the attachment parts 37 and 38 may be composed of magnets of different polarities.

In this case, there are no restrictions on the shape, size, number, and the like of each of the attachment parts 37 and 38, but the first attachment part 37 provided on the upper cap 12 includes a withdrawal hole 37a formed to enable the push protrusion 433 of the opening member 40, to be described later, to be drawn in and out by passing through in a vertical direction.

In addition, in the drawing, the exemplary embodiment is representatively illustrated such that the first attachment part 37 is built into the inner side surface of the upper cap 12 and the second attachment part 38 is coupled to be exposed to the inner side surface of the cover 14, but various forms such as an inverted configuration may be provided.

In the present invention, when the cover 14 is closed, the cover 14, in particular, the packing 14a inside the cover 14 is pressed against and adhered to the upper side of the upper cap 12 due to attachment with magnetic force of the attachment parts 37 and 38, so as to prevent the odors generated from garbage inside the garbage pouch from leaking into a gap between the upper cap 12 and the cover 14 through the inlet for garbage 12a.

The opening member 40 is connected to pass through the first attachment part 37 of the upper cap 12, and moves up and down in connection with the pressurizing and returning operation of the pressurizing panel 18, but when the opening member 40 is raised, the second attachment part 38 of the cover 14 is pushed and separated apart from the first attachment part 37.

Specifically, the opening member 40 is configured to include:

an operation bar 41 having a middle part thereof hingedly coupled to the lower side of the main body 10 and having opposite ends thereof operating in seesaw movement by the pressurizing panel 18;

a raising and lowering bar 42 connected upward at the outer end of the operation bar 41; and a push bar 43 having one end thereof hingedly coupled to the lower side of the upper cap 12 so as to rotate upward and downward by the raising and lowering bar 42, and including a push protrusion 433 which is fitted into the first attachment part 37 of the upper cap 12 and pushes the second attachment part 38 of the cover 14 when rotating upward.

The operation bar 41 changes a direction of the pressure applied to the pressurizing panel 18 to an upward direction so as to raise the raising and lowering bar 42.

Such an operation bar 41 includes: a pressed part 412 and a raised part 413, respectively having downwardly inclined opposite side ends connected to each other on the basis of a first shaft part 411 hingedly coupled to the main body 10 and positioned at the center therebetween; a pressed protrusion 412a protruding from the inner end of the pressed part 412 to a lower part of the pressurizing panel 18 to be connected thereto; and a pressurizing protrusion 413a which is bent upward at the outer end of the raised part 413 and connected to the raising and lowering bar 42.

The reason why the pressed part 412 and the raised part 413 are connected to each other inclined downward is to sufficiently secure heights of raising and lowering of the raising and lowering bar 42 through the pressurizing protrusion 413a, while reducing the space required for seesaw movement of the operating bar 41.

In addition, the raising and lowering bar 42 has a support part 421 bent inwardly and connected to the lower end thereof.

The pressurizing protrusion 413a and the support part 421 are in contact with each other in a separate form, so that the operation bar 41 and the raising and lowering bar 42 are connected to each other so as to be interlocked with each other.

The reason for this configuration is due to the fact that when the pressurizing protrusion 413a and the support part 421 are hingedly coupled to each other, a vertical angle of the raising and lowering bar 42 changes depending on the change in the rotation angle of the raised part 413, and unlike the opening and closing bar 181 used for opening and closing the cover 14, the push protrusion 433, which pushes and raises the second attachment part 38 of the cover 14, is separated from the second attachment part 38 without being hingedly coupled thereto.

In addition, at an upper end thereof, the raising and lowering bar 42 includes a pressurizing piece 422 bent in one side direction, wherein an upwardly rotating motion of the push bar 43 is operated by contacting the pressurizing piece 422 according to the raising of the pressurizing piece 422.

Such a raising and lowering bar 42 is slidably coupled to a guide bar 42A installed upright in the vertical direction on the inner side of the main body 10 to guide the raising and lowering.

The push bar 43 includes: a second shaft part 431 on one end thereof hingedly coupled to a bracket 12A enabling the lower side of the upper cap 12, more strictly, the first attachment part 37, to be mounted on the inner side surface of the upper cap 12; a pushed protrusion 432 on the other side thereof connected to the opposite side of the second shaft part 431 and arranged in a direction orthogonal to the pressurizing protrusion 413a; and a push protrusion 433 connected to protrude upward from the middle part of the push bar 43 so as to be fitted into the withdrawal hole 37a of the first attachment part 37.

Accordingly, when the pressed protrusion 412a of the operation bar 41 is pressed by the pressurizing panel 18, as a reaction against the above action, while the pressurizing protrusion 413a is raised, the support part 421 is pushed, whereby the raising and lowering bar 42 moves upward. At this time, since the operation bar 41 and the raising and lowering bar 42 are not hingedly coupled to each other, but are connected by contacting with each other in a separate form, the raising and lowering bar 42 is raised in a straight vertical direction along the guide bar 42A without changing any angle.

When the raising and lowering bar 42 is raised, the pressurizing piece 422 presses the pushed protrusion 432 of the push bar 43 upward so that the push bar 43 rotates upward, and accordingly, while being raised, the push protrusion 433 built in the withdrawal hole 37a is drawn out to the outside of the first attachment part 37, so that the second attachment part 38, which is magnetically attached to the first attachment part 37, is forcibly detached therefrom, and in this way, the cover 14 from which magnetic force of the attachment parts 37 and 38 is released is rotated upward by the upward pressure of the opening and closing bar 181, thereby opening the inlet for garbage 12a.

After that, when the external force applied to the pressurizing panel 18 is eliminated, the pressurizing panel 18 returns to its original position, and at the same time, the operation bar 41 is allowed to return to its original position as the push bar 43 and the raising bar 42 are lowered by their own weight.

Meanwhile, the pressurizing panel 18 is mainly pressed by a user to open the cover 14 due to the characteristics of a garbage can, and when a height of the cover 14 at which the opening is completed, that is, a raised height of the opening and closing bar 181, and a pressed height of the pressurizing panel 18 are different from each other, damage to the pressurizing panel 18 may occur.

That is, when the pressed height of the pressurizing panel 18 is too low, it is difficult to secure the raised height of the opening and closing bar 181 to such an extent where the cover 14 is completely open. Correspondingly, when a margin is given to the pressed height of the pressurizing panel 18, the pressurizing panel 18 is pressed more than necessary even in a state where the raising of the opening and closing bar 181 is completed, whereby damage may occur in the pressurizing panel 18, the raising and lowering bar 42, or the cover 14.

Accordingly, the present invention solves the above problems by allowing the pressurizing and returning operation of the pressurizing panel 18 to be performed in two steps of a folding structure.

Specifically, first, the pressurizing panel 18 includes: a pedal part 182 exposed to the outside of the lower side of the main body 10; a first rotating body 183 coupled to the inside of the pedal part 182 and axially installed on the lower side of the main body 10; a second rotating body 184 hingedly coupled to the inner end of the first rotating body 183 and connected to the opening and closing bar 181; and an elastic body 185 for elastically supporting the first and second rotating bodies 183 and 184 to return to their original positions after the individual rotation of the first and second rotating bodies 183 and 184.

The pedal part 182 is coupled to the first rotating body 183 by means of a connection bar 182a thereof having a predetermined length, protruding inwardly, and being fitted into the coupling hole 183a of the first rotating body 183.

The first rotating body 183 has the coupling hole 183a into which the connection bar 182a is inserted at the front end, and in this case, the connection bar 182a and the coupling hole 183a are coupled to each other in a hook-locking structure and the like so as to be able to adjust a withdrawal length of the connection bar 182a.

In addition, the first rotating body 183 is provided with a first axial installation part 183b inside the rear end thereof, so that a first rotary shaft 183A inserted into the first axial installation part 183b is hingedly coupled to the lower side of the main body 10.

In addition, the first rotating body 183 is provided with a second axial installation part 183c at the rear end thereof, so that a second rotary shaft 184A is inserted into the second axial installation part 183c and the third axial installation part 184a of a second rotating body 184, whereby the first and second rotating bodies 183 and 184 are hingedly coupled to each other to enable individual rotation.

The second rotating body 184 is provided with a third axial installation part 184a corresponding to the second axial installation part 183c at the front end, and a lower end of the opening and closing bar 181 is hingedly coupled to the rear end.

The elastic body 185 includes: a coil part 185a inserted from outside to the second rotary shaft 184A; first and second elastic branch pieces 185b and 185c each connected to an opposite end of a coil part 185a to exert elastic force in a direction of opening each other, the first elastic branch piece 185b elastically supporting the lower part of the first rotating body 183 upwardly and the second elastic branch piece 185c elastically supporting the lower part of the second rotating body 184 upwardly.

In such a pressurizing panel 18, [the pedal part 182 and the first rotating body 183] and [the second rotating body 184] are forcibly rotated upwardly to become an open state, without being folded downward with the second rotary shaft 184A as an axis, due to elastic force of the elastic body 185 in a state where no external force is applied to the pedal part 182.

In addition, when a user pressurizes (i.e., steps on) the pedal part 182, firstly, as a set of members, the pedal part 182, the first rotating body 183, and the second rotating body 184 perform a seesaw movement around the first rotary shaft 183A as an axis by elastic force of the elastic body 185, so that the opening and closing bar 181 is raised as the second rotating body 184 rotates upward, thereby opening the cover 14.

At this time, when the pedal part 182 is continuously pressed downward and the downward rotation continues even after the opening of the cover 14 is completed, that is, after the raising of the opening and closing bar 181 is completed, a pressure exceeding elastic force of the elastic body 185 is applied to the pedal part 182 in a state where the second rotating body 184 contacts the lower side of the main body 10 and the upward rotation stops, and accordingly, [the pedal part 182 and the first rotating body 183] continuously rotates downward around the second rotary shaft 184A as an axis, so that the first and second rotating bodies 183 and 184 are folded at a predetermined angle, thereby preventing damage to the parts due to the continued pressing of the pedal part 182.

After that, when the external force applied to the pedal part 182 is eliminated (i.e., when the user's foot is released), as elastic force of the elastic body 185 is transmitted to the first and second rotating bodies 183 and 184 through the first and second elastic branch pieces 185b and 185c, the rotating bodies 183 and 184 are unfolded, so that the pedal part 182 and the first and second rotating bodies 183 and 184 are rotated back to their original state. At this time, as the second rotating body 184 is pressed down by the downward closing due to its own weight of the cover 14, the pressurizing panel 18 is operated in a seesaw movement, so that the pressurizing panel 18 automatically returns to its original position.

In this way, in the present invention, even when the raised height of the opening and closing bar 181 and the lowered height of the pedal part 182 are not accurately matched, automatic opening and closing of the cover 14 is performed safely through the structure for individual rotation after the first and second rotating bodies 183 and 184 are operated together according to the pressure of the pedal part 182, thereby preventing damage or failure of parts during use.

In particular, in the present invention, after the cover 14 with magnetic force is automatically opened only by a simple operation of stepping on the pedal part 182 to open the cover 14, the cover 14 is automatically closed and magnetically attached only by removing the foot from the pedal part 182, so as to enhance airtightness, whereby users may use the garbage can easily and conveniently without any additional operation to prevent odor leakage.

In the above description of the present invention, a garbage can provided with an airtight means for preventing odor leakage has been described with reference to the accompanying drawings. However, the present invention can be variously modified, changed, and substituted by those skilled in the art, and such modifications, changes, and substitutions should be interpreted as falling within the protective scope of the present invention.

The invention claimed is:

1. A garbage can comprising:
a main body provided with a pressurizing panel, an upper cap having an inlet for garbage, and a cover for opening and closing the inlet for garbage in a casement method, wherein the pressurizing panel is hingedly coupled to a lower side of the main body and operating in seesaw movement;
an opening and closing bar vertically standing on a rear end of the main body and having opposite upper and lower side ends hingedly coupled to an inner end of the pressurizing panel and an inner side of the cover, respectively, so that the cover is automatically opened and closed due to pressurizing and returning operation of the pressurizing panel;
an airtight means for preventing odor leakage, the airtight means being provided at each position where the upper cap and the cover corresponds to each other and composed of a first attachment part of the upper cap and a second attachment part of the cover, which are magnetically attachable to each other, the first attachment including a withdrawal hole formed passing through in a vertical direction; and
an opening member capable of moving up and down in connection with the pressurizing and returning operation of the pressurizing panel, the opening member comprising a push protrusion built therein and separated from the second attachment part, so that the push protrusion is fitted into the withdrawal hole so as to pass through the first attachment part and push the second attachment part magnetically attached to the first attachment part to be separated from the first attachment part when raised.

2. The garbage can of claim 1, wherein the opening member comprises:
an operation bar having a middle part hingedly coupled to a lower side of the main body and having opposite ends thereof operated in seesaw movement by the pressurizing panel;
a raising and lowering bar connected to an upper side at an outer end of the operation bar; and
a push bar comprising the push protrusion that has one end thereof hingedly coupled to a lower side of the upper cap to be rotated up and down by the raising and lowering bar, is fitted into the first attachment part of the upper cap, and pushes the second attachment part of the cover when rotating upward.

3. The garbage can of claim 2, wherein the operation bar comprises:
a pressed part and a raised part respectively having downwardly inclined opposite ends connected to each other on the basis of a shaft part positioned at a center therebetween;
a pressed protrusion protruding from an inner end of the pressed part to a lower part of the pressurizing panel so as to be connected; and
a pressurizing protrusion bent upward at an outer end of the raised part and connected to the raising and lowering bar.

4. The garbage can of claim 3, wherein the raising and lowering bar is provided with a support part having a lower end thereof bent inward to be connected, and
the pressurizing protrusion and the support part are in contact with each other in a separated form and connected to each other so that the operation bar and the raising and lowering bar are interlocked with each other.

* * * * *